(12) United States Patent
Dharmadhikari et al.

(10) Patent No.: US 9,819,583 B2
(45) Date of Patent: Nov. 14, 2017

(54) SYSTEMS AND METHODS FOR ENERGY COST AWARE ROUTING

(71) Applicant: DELL PRODUCTS L.P., Round Rock, TX (US)

(72) Inventors: Vivek Dharmadhikari, San Jose, CA (US); Sanjay Sane, Fremont, CA (US); Vinay Sawal, Fremont, CA (US)

(73) Assignee: DELL PRODUCTS LP, Round Rock, TX (US)

( * ) Notice: Subject to any disclaimer, the term of this patent is extended or adjusted under 35 U.S.C. 154(b) by 142 days.

(21) Appl. No.: 14/609,376

(22) Filed: Jan. 29, 2015

(65) Prior Publication Data

US 2016/0226757 A1  Aug. 4, 2016

(51) Int. Cl.
| | | |
|---|---|---|
| *H04L 12/28* | (2006.01) | |
| *H04L 12/721* | (2013.01) | |
| *H04L 12/26* | (2006.01) | |

(52) U.S. Cl.
CPC .............. *H04L 45/70* (2013.01); *H04L 43/08* (2013.01)

(58) Field of Classification Search
CPC ................................. H04L 43/08; H04L 45/70
USPC ......................................................... 370/311
See application file for complete search history.

(56) References Cited

U.S. PATENT DOCUMENTS

| | | | | |
|---|---|---|---|---|
| 2006/0153081 A1* | 7/2006 | Simonsson | ............. | H04L 45/00 370/238 |
| 2007/0028198 A1* | 2/2007 | New | ................... | G06F 17/5045 716/105 |
| 2011/0016342 A1* | 1/2011 | Rowan | ................ | G06F 11/3006 713/340 |
| 2011/0205919 A1* | 8/2011 | Imai | ...................... | H04L 45/127 370/252 |
| 2011/0228777 A1* | 9/2011 | Samajpati | ............. | H04W 40/10 370/392 |
| 2011/0299412 A1* | 12/2011 | Diab | ........................ | H04L 12/12 370/252 |
| 2012/0047384 A1* | 2/2012 | Morris | .................... | G06F 1/263 713/340 |
| 2012/0047504 A1* | 2/2012 | Morris | .................. | G06F 9/5094 718/100 |
| 2013/0315257 A1* | 11/2013 | Welin | ...................... | H04L 45/12 370/401 |
| 2015/0023196 A1* | 1/2015 | Schlenk | .............. | G06F 11/3006 370/252 |
| 2015/0195187 A1* | 7/2015 | Savolainen | ........... | H04W 40/02 370/401 |
| 2015/0208341 A1* | 7/2015 | Mohamed | ............... | H04L 43/08 370/311 |

\* cited by examiner

*Primary Examiner* — Farah Faroul
(74) *Attorney, Agent, or Firm* — North Weber & Baugh LLP (57) ABSTRACT

Aspects of the present invention include selecting a route based on energy cost. Energy cost is evaluated based on a power metric. The power metric is determined based on an energy cost related attribute and a corresponding weight. In embodiments of the present invention, money can be saved based on electricity savings. In embodiments of the present invention "green" power can be used more often than fossil fuel power.

20 Claims, 6 Drawing Sheets

SYSTEMS AND METHODS FOR ENERGY COST AWARE ROUTING

BACKGROUND

Field of Invention

The present invention relates generally to power consumption and relates more particularly to power efficient networking devices.

Description of the Related Art

Measurement of power consumption is not typically considered in network routing. In other words, the only factors considered in network path selection is length of path, number of hops, etc., but no consideration is given to power consumption or energy efficiency.

It is important and beneficial to determine the power consumption of a particular component of a networking device and to the power consumption of a particular location. To build power efficient networking systems, it is first important to profile it power consumption of particular components, such as a switch or router and also of a particular geographic location. Accurate measurement of power consumption of networking devices enables development of efficient power management schemes for them.

However, the prior art networking protocols consider throughput and efficiency in routing decisions.

BRIEF DESCRIPTION OF THE DRAWINGS

Reference will be made to embodiments of the invention, examples of which may be illustrated in the accompanying figures, in which like parts may be referred to by like or similar numerals. These figures are intended to be illustrative, not limiting. Although the invention is generally described in the context of these embodiments, it should be understood that it is not intended to limit the spirit and scope of the invention to these particular embodiments. These drawings shall in no way limit any changes in form and detail that may be made to the invention by one skilled in the art without departing from the spirit and scope of the invention.

DESCRIPTION OF THE PREFERRED EMBODIMENTS

In the following description, for purposes of explanation, specific examples and details are set forth in order to provide an understanding of the invention. It will be apparent, however, to one skilled in the art that the invention may be practiced without these details. Well known process steps may not be described in detail in order to avoid unnecessarily obscuring the present invention. Other applications are possible, such that the following examples should not be taken as limiting. Furthermore, one skilled in the art will recognize that aspects of the present invention, described herein, may be implemented in a variety of ways, including software, hardware, firmware, or combinations thereof.

Components, or modules, shown in block diagrams are illustrative of exemplary embodiments of the invention and are meant to avoid obscuring the invention. It shall also be understood that throughout this discussion that components may be described as separate functional units, which may comprise sub-units, but those skilled in the art will recognize that various components, or portions thereof, may be divided into separate components or may be integrated together, including integrated within a single system or component. It should be noted that functions or operations discussed herein may be implemented as components or modules.

Furthermore, connections between components within the figures are not intended to be limited to direct connections. Rather, data between these components may be modified, re-formatted, or otherwise changed by intermediary components (which may or may not be shown in the figure). Also, additional or fewer connections may be used. It shall also be noted that the terms "coupled" or "communicatively coupled" shall be understood to include direct connections, indirect connections through one or more intermediary devices, and wireless connections.

In the detailed description provided herein, references are made to the accompanying figures, which form a part of the description and in which are shown, by way of illustration, specific embodiments of the present invention. Although these embodiments are described in sufficient detail to enable one skilled in the art to practice the invention, it shall be understood that these examples are not limiting, such that other embodiments may be used, and changes may be made without departing from the spirit and scope of the invention.

Reference in the specification to "one embodiment," "preferred embodiment," "an embodiment," or "embodiments" means that a particular feature, structure, characteristic, or function described in connection with the embodiment is included in at least one embodiment of the invention and may be in more than one embodiment. Also, such phrases in various places in the specification are not necessarily all referring to the same embodiment or embodiments. It shall be noted that the use of the terms "set" and "group" in this patent document shall include any number of elements. Furthermore, it shall be noted that methods or algorithms steps may not be limited to the specific order set forth herein; rather, one skilled in the art shall recognize, in some embodiments, that more or fewer steps may be performed, that certain steps may optionally be performed, and that steps may be performed in different orders, including being done some steps being done concurrently.

The present invention relates in various embodiments to devices, systems, methods, and instructions stored on one or more non-transitory computer-readable media involving the communication of data over networks. Such devices, systems, methods, and instructions stored on one or more non-transitory computer-readable media can result in, among other advantages, the ability to deploy power measurement on a component level in a live network or to design network devices.

It shall also be noted that although embodiments described herein may be within the context of power consumption in a network device, the invention elements of the current patent document are not so limited. Accordingly, the invention elements may be applied or adapted for use in other contexts.

It is important to be able to measure the power consumption of a device on a component level. Ideally, each component should operate in its "sweet spot" of power consumption. Having each component operate within their ideal power specifications can extend the life of the component and therefore the device.

Further, a device or an entire network can be designed to optimize for power consumption if the power consumption of a particular component can be accurately measured in a live network. Thus advantages can be achieved, such as analysis of power consumption at a component level deployed in a live network or during design of network devices.

Embodiments of the present invention have many advantages. For example, they allow power consumption to be evaluated at a component level. Other advantages include the ability to make routing decisions based on power or energy savings.

Embodiments of the present invention overcome the deficiencies of the prior art networking routing systems and methods. Embodiments of the present invention comprise a system and method for routing based on energy efficiency.

Embodiments of the present invention allow building a power profiler for a networking device which can have the following features:

One feature is that the need to use external hardware, like power-meter/multi-meter to measure power consumption, is eliminated. Another feature is that coarse grained power consumption, i.e., aggregate power consumption of the entire networking devices is provided. Yet another feature of embodiments of the present invention is that fine grained power consumption, i.e., component level power consumption of the networking device can be provided. In other words, it provides answers to question "Where does the power go in networking devices?"

Another feature of embodiments of the present invention use a routing protocol metric extension called "energy cost" that can be added to any prior art routing protocol. This extension can enable a global near-optimal energy cost-aware routing. The extension can use many parameters that impact energy cost. The proposed metric can be used in both Interior Gateway Protocol (IGP) routing protocol such as Open Shortest Path First (OSPF) and Exterior Gateway Protocol (EGP) routing protocol such as Boarder Gateway Protocol (BGP).

Figure 1:
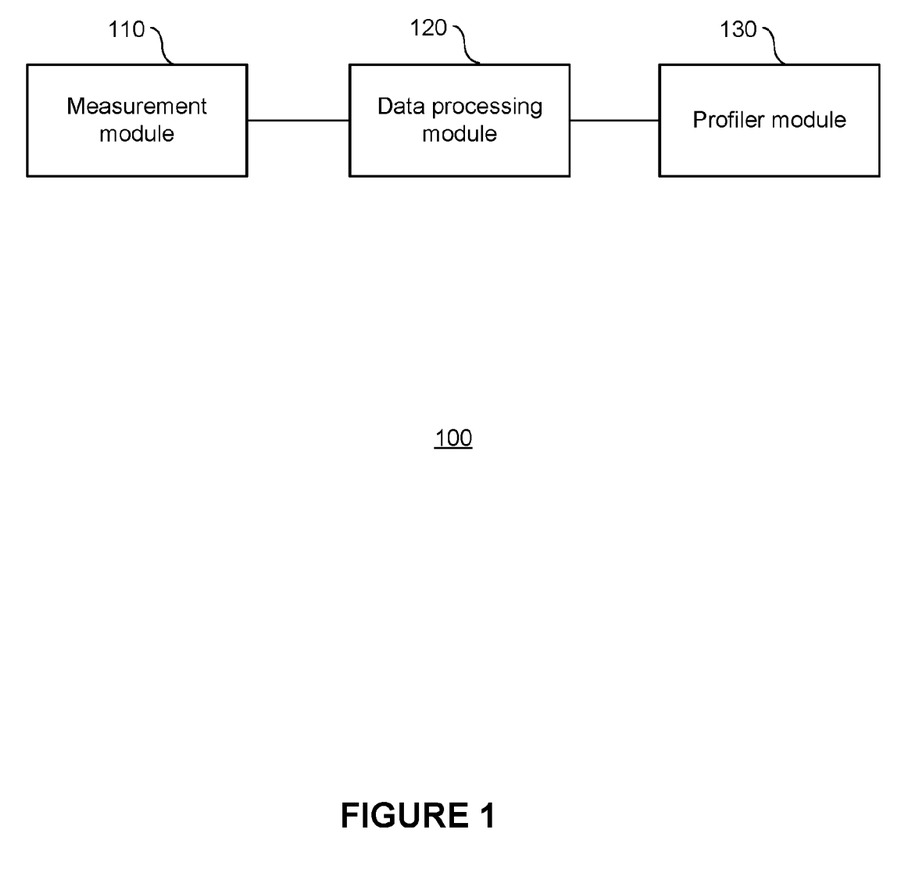
FIG. 1 depicts a block diagram according to embodiments of the present invention.

FIG. 1 depicts a block diagram 100 according to embodiments of the present invention. FIG. 1 shows a measurement module 110, a data processing module 120, and a profiler module 130.

Figure 2:
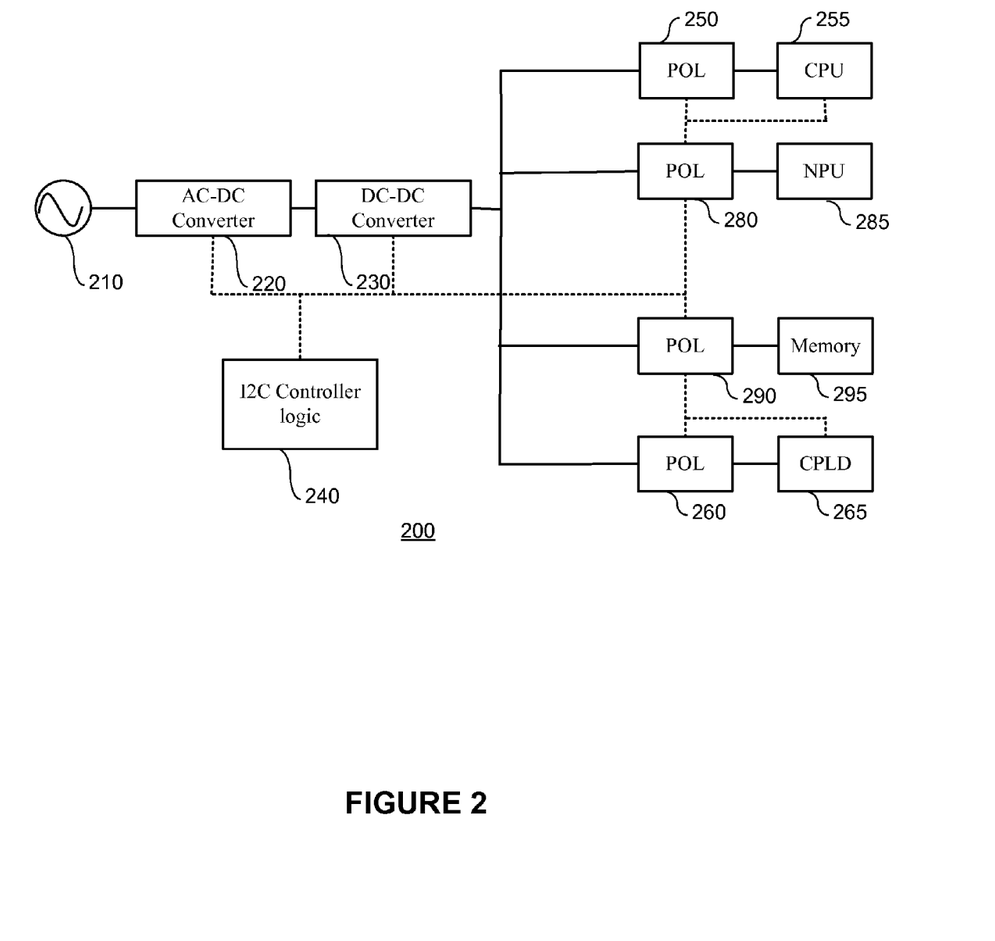
FIG. 2 depicts an example of a power measurement module according to embodiments of the present invention.

The measurement module 110 consists of power distribution network comprising digital Point-of-load (POL) devices to monitor and control power delivered to strategic components such as Central Processing Unit (CPU), memory, Networking Processing Unit (NPUs), Field Programmable Gate Arrays (FPGA), Fan Trays, Power Supply Unit (PSU), etc. FIG. 2 provides more detail as to one embodiment of hardware that can be implemented as the measurement module 110.

The data processing module 120 can be implemented as a kernel driver running on a processor which does read/write to the POL to gather power consumption data using protocol such as Power Management Bus (PMBUS). Data processing can be local or external to the networking device. The data processing module 120 can read data such as current voltage, current, power, temperature, etc. from the POL. This data provides the current state of the system with respect to power.

The profiler module 130 can be implemented as a software application, which interfaces with the data processing module to collect power consumption data and profile the power consumption over a period of time. The profiler module 130 can be inside or outside of the data mining device. For example, the profiler module 130 periodically, e.g., every one minute, instructs the data processing module 120 to read/write data. The profiler than act on that data to interpret it. For example, the profiler module 130 can display every minute the power consumed by the whole device or its components and calculate dollar cost of operating entire device and its components. The profiler module 130 can run on a processor or server locally or outside of the networking device.

Embodiments of the present invention can be implemented as a service of networking device operating system. It can run in kernel and provide APIs that applications use to query the coarse and fine grained power consumption. This permits the power management scheme to be implemented. For example, using the power consumption data gleaned from API, it is possible implement power management schemes.

FIG. 2 depicts an example of a power measurement module 200 according to embodiments of the present invention. The power measurement module can be used to determine per port power consumption. FIG. 2 shows an alternating current (AC) source 210. AC source 210 can be a 120-220 V power source. FIG. 2 also shows an AC-to-DC converter 220. The AC source can be a PSU, which can take line voltage (120-240V) from the utility and covert the AC voltage source into DC, e.g. 48V DC. In one embodiment, the AC-DC converter 220 interfaces to the host CPU using industry standard I2C bus. However any bus structure can be used.

FIG. 2 also shows DC-DC converter 230. DC-to-DC converter 230 converts output from AC-to-DC converter 120 into voltage ranges suitable for feeding as input to the POL 250, 260, 280, or 290. POLs 250, 260, 280, and 290 can be step down DC-to-DC converters. They can measure any relevant telemetry including temperature, amount of current, amount of voltage or amount of output power. Further, the measurements can be instantaneous or average measurements. POLs 250, 260, 280 and 290 can be simple or complex DC to DC converters. Further, POLs can have hardware with firmware running on them to store telemetry.

POLs 250, 260, 280, or 290 accept power input from DC-to-DC converter 230 and provide DC power to individual circuit block also known as load in the system such as CPU, memory, NPU, etc. POL 250 interfaces to host CPU 255 using industry standard I2C bus. However, one of ordinary skill in the art will appreciate that any appropriate bus can be used. The I2C bus is depicted in FIG. 2 with a dashed line. The solid line in FIG. 2 indicates a power rail.

I2C bus can be used to wire the POLs 250, 260, 280, and 290 to CPU 255 and Complex Programmable Logic Device (CPLD) 265. The I2C bus acts as channel over which telemetry data such as current voltage/current/power/temperature can be conveyed to CPU 255.

Each POL 250, 260, 280, and 290 can be coupled to a different network device component. For ease of illustration only three components are shown. However, any number of components could be measured using an appropriate number of POLs. FIG. 2 shows POL 250 coupled to CPU 255, POL 280 coupled to Network Processing Unit (NPU) 285, POL 290 coupled to memory 295, and POL 280 coupled to CPLD 265.

FIG. 2 also shows I2C controller logic 240 coupled to POL 250, CPU 255, POL 280, NPU 285, POL 290, memory 295, POL 280, and CPLD 265.

Figure 3:
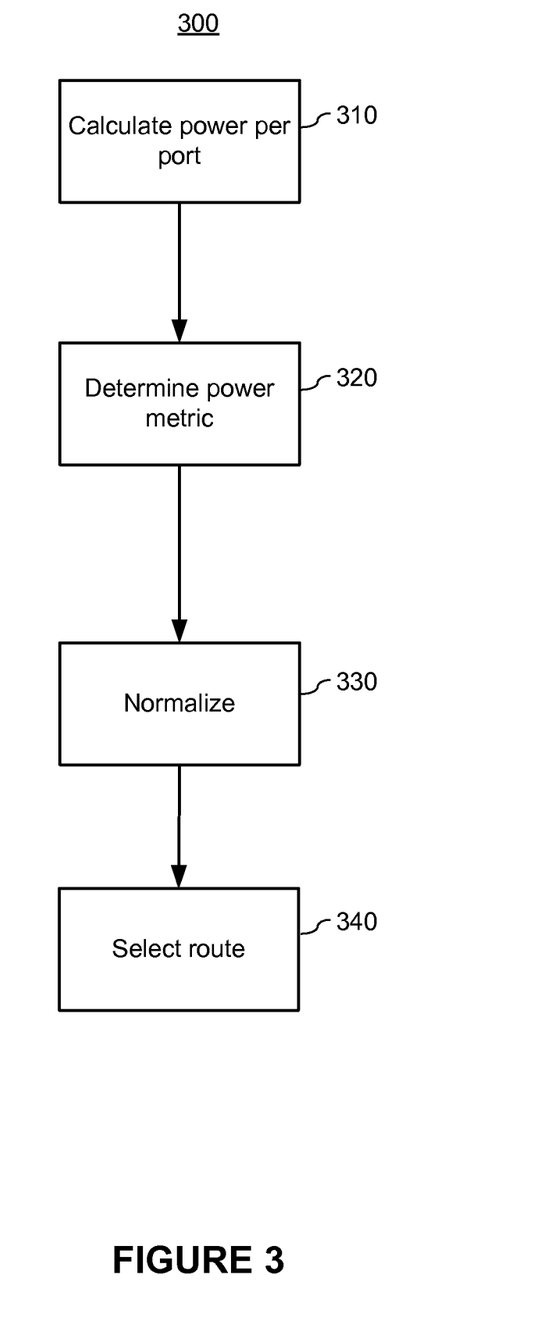
FIG. 3 depicts a flowchart for selecting a route based energy efficiency.

FIG. 3 depicts a flowchart for a process 300 for selecting a route based energy efficiency. FIG. 3 shows calculating power per port 310. Embodiments of the present invention measure power delivered to major components per port. FIG. 3 also shows determining power metric 320. Many different power attributes that can impact energy cost can be considered in determining the power metric. One of ordinary skill in the art will understand that many different attributes can be used. For example, attributes can be cost of electricity, temporal electricity price, season, geographic location, type of power, likelihood of power outages, likelihood of reduced electricity usage, type of power used, proximity to power source, temperature, weather, likelihood of event (e.g., tornado, earthquake, flood, etc.), likelihood that other users will have a high power need, and any other metric that can impact energy cost.

Cost of electricity is the cost the electricity provider charges for the electricity. Different geographic locations can have different costs of electricity. Also, the cost can vary based on time of day or season or type of power.

Temporal Electricity Price: Some electricity providers charge electric rates that vary with time of day and other patterns. For example:

| Time Period | Definition | Hours of day | Days of week | Price per kWh |
|---|---|---|---|---|
| On Peak | Demand for electricity is high. | 3-8 p.m | Monday-Friday | 12.142 ¢/kWh |
| Medium Peak | Demand for electricity is Medium | 6 a.m.-3 p.m. 8-10 p.m. 6 a.m.-10 p.m. | Monday-Friday Saturday | 6.967 ¢/kWh |
| Off Peak | Demand for electricity is the lowest. | 10 p.m.-6 a.m. 6 a.m.-10 p.m | Every day Sunday | 4.048 ¢/kWh |

Dollar Cost of Router Port = Per Port Power consumption * Price per kWh.

Season: season is the time of year. For some electricity providers, the season impacts the cost of electricity. Also, some electricity providers have blackouts or brown outs at certain times of year.

Geographical location of the Router: Geographic location of the router refers to the location of the router. Some metropolitan cities have higher power rates than rural areas. Location awareness can also help in avoiding power consumption during certain periods. For example, during peak summer time in Los Angeles, the power grid is already over-loaded. In this situation, the embodiments of the present invention can avoid using any more power from the grid.

Type of Power: The type of power refers to how the power was generated, for example, fossil fuels power, solar power, wind power, etc. For example, a certain type of power can be more desirable than other types.

Likelihood of power outages: some places have a higher likelihood of power outages than other places. This likelihood can be based on geography, usage, season, weather, or any other factor.

Likelihood of reduced electricity usage: likelihood of reduced electricity usage refers to the likelihood that electricity users will be asked or incentivized to reduce electricity usage. For example, in the summer in Los Angeles users can be asked to reduce electricity usage.

Proximity to Power source: this attribute is important because power loss can be associated with transmission and distribution of power.

Temperature: temperature refers to the air temperature at a particular router. In some cases if a location is too hot, for example, Los Angeles in summer, or sometimes too cold, users can be asked to reduce power consumption.

Weather: weather includes everything from temperature to winter storm, hurricane, tornado, and can impact the availability of power from an electricity provider.

Likelihood of event (e.g., tornado, earthquake, flood, etc.): refers to the forecast for a particular power impact event. For example, if there is a flood at a particular location, that location can be avoided.

Likelihood that other users will have a high power need: the likelihood of other users having a high power need refers to the power needs of other users, for example to run heat or air conditioning or because power is limited and can be sent to critical uses such as hospitals. This attribute can impact the view within the community and the citizenship of the network.

For the purpose of explanation, the following metrics will be considered herein: temporal electricity price, geographical location of the router, type of power, and proximity to the power source.

Embodiments of the present invention can determine the power metric using the above attributes and assigned weights.

For example:

TABLE 1

Power Metric Port attributes and associated weights

| Port Attribute and Weight | Attribute Function/Description | Weight Function/Description |
|---|---|---|
| A1, W1 | Time-of-day attribute. This attribute can be defined as a value that can fall into one of the following buckets:<br>1. Peak time<br>2. Off-peak time | A multiplier can be attached to each attribute to influence its importance in the overall calculation of Power metric based on customer requirement. Normally, all things being equal, this multiplier can be set to 1. |
| A2, W2 | Port Location: Geographic location of the port being used in routing. | Same as above. |
| A3, W3 | Seasonal change: This attribute can take up one of the following values:<br>1. Summer | Same as above. |

TABLE 1-continued

Power Metric Port attributes and associated weights

| Port Attribute and Weight | Attribute Function/Description | Weight Function/Description |
|---|---|---|
| | 2. Winter<br>3. Peak season<br>4. Off season | |
| A4, W4 | Power source: Source of power being utilized by the port. This attribute can be one of the following:<br>1. Renewable source<br>  a. Solar<br>  b. Wind<br>  c. Tidal<br>  d. Biomass<br>2. Non-renewable<br>  a. Coal<br>  b. Natural Gas/Oil<br>  c. Nuclear | Same as above. |
| . . . | . . . | . . . |
| An, Wn | User defined attribute | User defined weight |

A non-empty set of port attributes can be represented as:
$A = \{A_1, A_2, A_3, \ldots, A_n\}$
Where A is an attribute, $A_1$, $A_2$, etc. can be selected form the attribute list above or any other relevant attribute.

And a non-negative set of weights associated with above mentioned port attributes can be represented as:
$W = \{W_1, W_2, W_3, \ldots, W_n\}$
Where W is a weight and $W_1$, $W_2$, etc. can be user defined weights or predetermined weights.

In order to determine the power metric, embodiments of the present invention can use a weighted arithmetic mean as follows:

$$P = \frac{\sum_{i=1}^{n} (A_i * W_i)}{\sum_{i=1}^{n} (W_i)}$$

FIG. 3 also shows normalize 330.

Once embodiments of the present invention have determined the power metric available, it can be normalized to appropriate base protocol routing metric. For example, the power metric takes a value in the following range:

Power Metric Range=[M . . . N]

The routing metric is dependent on the type of routing protocol. For example in the case of BGP-MED, this attribute takes a value between 1 and $(2^{32}-1)$. For the OSPF protocol, the attribute takes a value between 1 and $(2^{16}-1)$. It can be represented in a range set as follows:

Protocol Metric Range=[X . . . Z]

To convert the power metric range to a protocol specific value range, embodiments of the present invention can use the following range normalization function. Thus, for a given value α in range [M . . . N], normalized energy cost value β in range [X . . . Z] is defined as:

$$\beta(\text{Energy Cost}) = 1 + (\alpha - M) \times \frac{(Z - X)}{(N - M)}$$

By changing the range end-points of the protocol metric range, the above stated formula can be utilized seamlessly for range normalization between:

Directly proportional metrics where a higher value of power metric yields a higher value of protocol metric. In this category, the power metric has a range between [M . . . N] and protocol metric has a range between [X . . . Z].

Inversely proportional metrics where a higher value of power metric yields a lower value of protocol metric. In this category, the power metric has a range between [M . . . N] and protocol metric has a range between [Z . . . X].

FIG. 3 also shows selecting a route 340. Once the power metric is determined and normalized, it can be used by routing protocol.

For an IGP routing protocol such as OSPF, the energy cost metric can now be set as link cost in addition to use of traditional routing matrices such as bandwidth, speed, latency etc.

For an EGP routing protocol such as BGP, energy cost routing metric can be used as Multi Exit Discriminator (MED) value.

Note that the energy cost metric can be automatically calculated and used by routing protocol or it can be provided as a configurable entity in a Command Line Interface (CLI) so users have full control over it.

Figure 4:
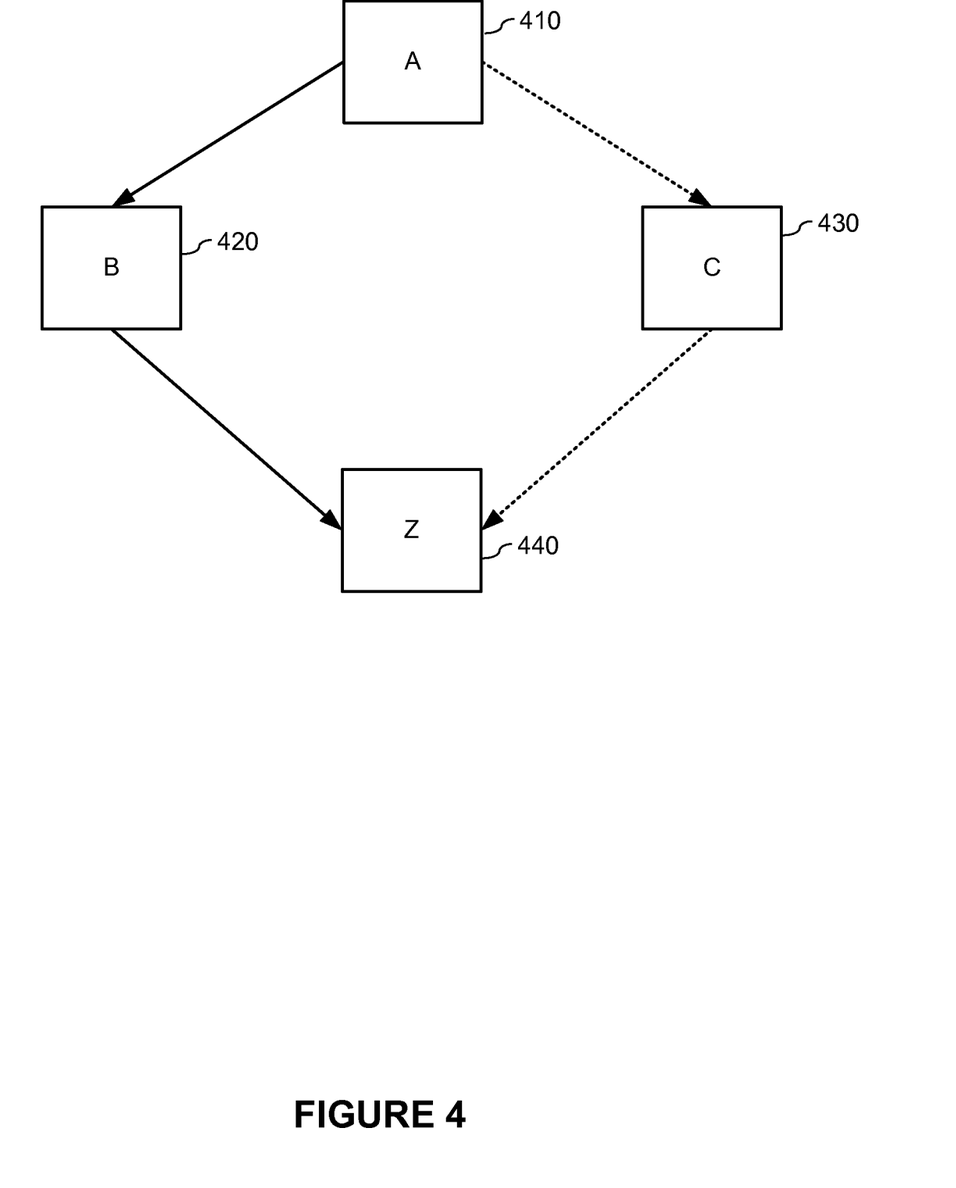
FIG. 4 depicts a network topology according to embodiments of the present invention.

FIG. 4 depicts a network topology 400 according to embodiments of the present invention. The network topology in FIG. 4 shows router A 410, router B 420, router C 430, and router Z 440. The topology in FIG. 4 is used to show an example where router A 410 wants to talk to router Z 440. In this simplified example, there are two possible paths, A 410 to B 420 to Z 440 (shown with a solid line) or A 410 to C 430 to Z 440 (shown with a dashed line). The above example will assume that each path is an equal cost path, meaning the two paths would have the same cost in a prior art protocol. Therefore, traffic would be split between the paths.

Employing embodiments of the present invention, each of routers A 410, B 420, C 430, and Z 440 will have a normalized power metric value $A_1$, $B_1$, $C_1$, and $Z_1$. B and C can each communicate their power metric values $B_1$ and $C_1$ to A and Z. Therefore, A can select a path that has the lower power metric value and the most energy savings as determined by a user.

Figure 5:
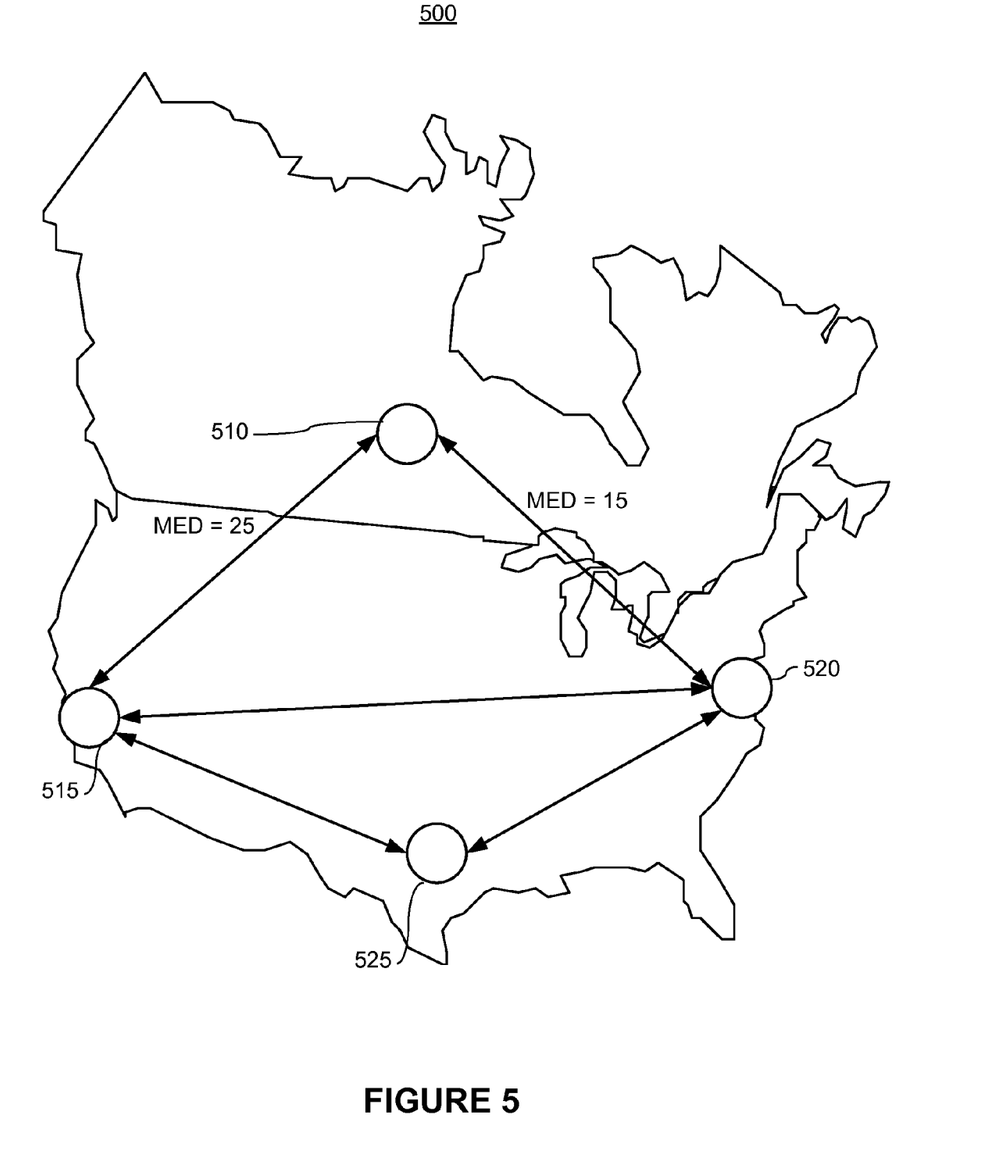
FIG. 5 depicts a network topology according to embodiments of the present invention.

FIG. 5 depicts a network topology 500 according to embodiments of the present invention. FIG. 5 depicts a network topology similar to FIG. 4, but where the routers are located in different geographic regions. FIG. 5 shows a router AS 100 in Canada 510, a router in California 515, a router in New York 520, and a router in Texas 525.

When crossing over an Autonomous System (AS) boundary, BGP MED is an optional non-transitive attribute which provides a dynamic way to influence another AS in the way to reach a certain route if there exist multiple routes for that Autonomous System. The MED attribute has a value that is referred to as a power metric. If all other factors in determining an exit point are equal, the exit point with the lowest power metric is preferred.

As shown in FIG. 5, there is a Canadian Internet Service Provider (ISP) with Autonomous System number AS-100 510 consisting of a router in Manitoba and a United States ISP with AS-200 with routers in California 515, Texas 525 and New York 520. Thus, if a Canadian router 510 wants to exchange data with a Texas router 525, it has a choice among two alternative routes into AS-200 which is as follows:

It can either choose California router 515 and path Canada 510 to California 515 to Texas 525. Alternatively, it can choose New York router 520 and path Canada 510 to New York 520 to Texas 525.

If all the parameters associated with link connection joining the Canada router 510 to California router 515 and New York router 520 are similar, the algorithm described above can be used to calculate "energy cost" metric for these links that can aid in better cost effective routing between the Canada router 510 and the Texas router 525.

Figure 6:
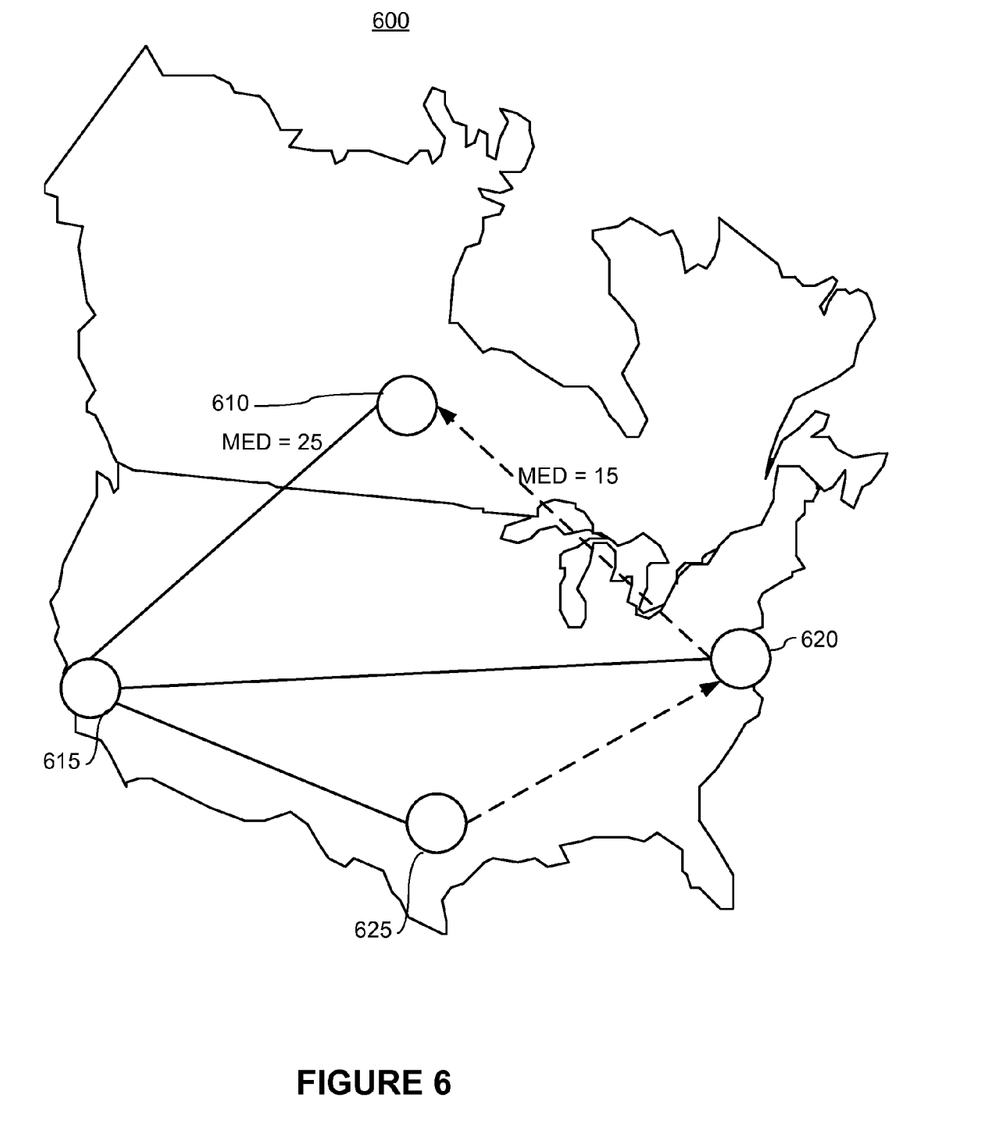
FIG. 6 depicts a network topology according to embodiments of the present invention.

FIG. 6 depicts a network topology 600 according to embodiments of the present invention. FIG. 6 shows Canada router 610. California router 615, New York router 620, and Texas router 625.

FIG. 6 also shows the MEDs attached to the routes announced by California router 615 and New York router 620. For instance, as shown in FIG. 6, MED value announced by California router 615 is 25 and New York router 620 is 15. The Canada router 610 will select the route with smaller MED, hence the route passing by the New York router 620 resulting in cost-effective route selection.

For example, assume that price differential in electricity rates at New York and California is significant. At 6 am eastern time, traffic can routed via California, which is still sleeping and has a lower electricity rate at that time, and therefore lower energy cost metric than New York. This will result in cost saving for New York router during morning.

It will be understood by one of ordinary skill in the art that due to time zone differences, the peak period for New York and California will likely not overlap. In other words, electricity rate for New York in its peak period will be higher than electricity rate for California. Embodiments of the present invention can use this fact to route packets via California during New York's peak period resulting in energy cost saving for the ISP.

The present invention uses the algorithm described above in reference to FIG. 3 to derive energy cost and assign it as link cost of each of router's port. The router than uses shortest path algorithm to derive cost optimal routing path. The paths will be cost optimal because its link cost is direct reflection of dollar cost operating that link. So an optimal routing path will be chosen that will be result in dollar saving for router.

Embodiments of the present invention can have the algorithm run on a predetermined basis, for example, twice a day or four times a year. Alternatively, the attributes and weights can be changed dynamically by a user.

An advantage of the present invention is cost savings in terms of dollars. Another advantage of the present invention is ability to be a good neighbor by reducing energy consumption at certain times. Another advantage of the present invention is to be "green" or use power source other than fossil fuels.

One of ordinary skill in the art will appreciate that various benefits are available as a result of the present invention. One such benefit is that embodiments of the present invention can result in significant cost savings.

Another benefit is that embodiments of the present invention can improve the community impact of a large power user. Another embodiment of the present invention is the use of more "green" power.

It shall be noted that aspects of the present invention may be encoded upon one or more non-transitory computer-readable media with instructions for one or more processors or processing units to cause steps to be performed. It shall be noted that the one or more non-transitory computer-readable media shall include volatile and non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

While the inventions have been described in conjunction with several specific embodiments, it is evident to those skilled in the art that many further alternatives, modifications, application, and variations will be apparent in light of the foregoing description. Thus, the inventions described herein are intended to embrace all such alternatives, modifications, applications and variations as may fall within the spirit and scope of the appended claims.

What is claimed is:

1. A method for facilitating a routing decision that considers power related to a networking device as a factor in the routing decision, the method comprising:
    calculating a power per port value of the networking device by measuring power consumed by the networking device in a time period;
    determining a power metric to be used as a factor when making a routing decision, the power metric comprising an attribute determined using the power per port value and an energy cost for the networking device and a corresponding weight that influences the attribute's overall importance in the power metric;
    selecting a route using, at least in part, the power metric; and
    routing data based upon the selected route.

2. The method of claim 1 wherein the step of selecting a route using, at least in part, the power metric further comprises using at least one power metric received in a communication from another networking device.

3. The method of claim 1 wherein the power metric comprises a weighted sum of a plurality of attributes with each attribute being multiplied by a corresponding weight that influences the attribute's overall importance in the weighted sum.

4. The method of claim 3 wherein at least one of the attributes and the weights has a predetermined value.

5. The method of claim 3 wherein at least one of the attributes and the weights has a dynamically defined value.

6. The method of claim 3 wherein the power metric represents a weighted arithmetic mean of the weighted sum of the plurality of attributes.

7. The method of claim 1 further comprising including a value representing the power metric in a communication that complies with a protocol and wherein the protocol is an Interior Gateway Protocol (IGP) routing protocol and the power metric is factored into a link cost, which is used when making a routing decision.

8. The method of claim 7 wherein the link cost also considers at least one additional routing metric comprising bandwidth, speed, and latency.

9. The method of claim 1 further comprising including a value representing the power metric in a communication that complies with a protocol and wherein the protocol is an Exterior Gateway Protocol (EGP) routing protocol and the power metric is factored into a Multi Exit Discriminator (MED) value, which is used when making a routing decision.

10. A non-transitory computer readable medium or media comprising one or more sequences of instructions which, when executed by one or more processors, causes steps for facilitating a routing decision that considers power related to a networking device as a factor in the routing decision comprising:
   calculating a power per port value of the networking device by measuring power consumed by the networking device in a time period;
   determining a power metric to be used as a factor when making a routing decision, the power metric comprising an attribute determined using the power per port value and an energy cost for the networking device and a corresponding weight that influences the attribute's overall importance in the power metric;
   selecting a route using, at least in part, the power metric; and
   routing data based upon the selected route.

11. The non-transitory computer readable medium or media of claim 10 wherein the step of selecting a route using, at least in part, the power metric further comprises using at least one power metric received in a communication from another networking device.

12. The non-transitory computer readable medium or media of claim 10 wherein the power metric comprises a weighted sum of a plurality of attributes with each attribute being multiplied by a corresponding weight that influences the attribute's overall importance in the weighted sum.

13. The non-transitory computer readable medium or media of claim 12 wherein the power metric represents a weighted arithmetic mean of the weighted sum of the plurality of attributes.

14. The non-transitory computer readable medium or media of claim 10 further comprising including a value representing the power metric in a communication that complies with a protocol and wherein the protocol is an Interior Gateway Protocol (IGP) routing protocol and the power metric is factored into a link cost, which is used when making a routing decision.

15. The non-transitory computer readable medium or media of claim 14 wherein the link cost also considers at least one additional routing metric comprising bandwidth, speed, and latency.

16. The non-transitory computer readable medium or media of claim 10 further comprising including a value representing the power metric in a communication that complies with a protocol and wherein the protocol is an Exterior Gateway Protocol (EGP) routing protocol and the power metric is factored into a Multi Exit Discriminator (MED) value, which is used when making a routing decision.

17. A networking device that can facilitate a routing decision that considers power related to the networking device as a factor in the routing decision, the networking device comprising:
   one or more processors;
   a plurality of ports communicatively coupled to at least one of the one or more processors;
   a non-transitory computer-readable medium or media comprising one or more sequences of instructions which, when executed by at least one of the one or more processors, causes steps to be performed comprising:
      calculating a power per port value of the networking device by measuring power consumed by the networking device in a time period;
      determining a power metric to be used as a factor when making a routing decision, the power metric comprising an attribute determined using the power per port value and an energy cost for the networking device and a corresponding weight that influences the attribute's overall importance in the power metric;
      selecting a route using, at least in part, the power metric; and
      routing data based upon the selected route; and
   at least one supply power for suppling power to the information handling system.

18. The networking device of claim 17 further comprising:
   a power measurement circuitry including point of load circuitry for measuring telemetry data associated with a plurality of components within the networking device while the networking device is operational and supplies at least some telemetry data to a profiling module that calculate the power per port value of the networking device using at least some of the telemetry data.

19. The networking device of claim 17 wherein the power metric comprises a weighted sum of a plurality of attributes with each attribute being multiplied by a corresponding weight that influences the attribute's overall importance in the weighted sum.

20. The networking device of claim 17 further comprising including a value representing the power metric in a communication that complies with a protocol and wherein the protocol is at least one of:
   an Interior Gateway Protocol (IGP) routing protocol and the power metric is factored into a link cost, which is used when making a routing decision; and
   an Exterior Gateway Protocol (EGP) routing protocol and the power metric is factored into a Multi Exit Discriminator (MED) value, which is used when making a routing decision.

* * * * *